(12) United States Patent
Carpenter, Jr. et al.

(10) Patent No.: US 9,817,458 B2
(45) Date of Patent: Nov. 14, 2017

(54) ADAPTIVE USB PORT CONTROLLER

(71) Applicant: Active-Semi, Inc., Tortola (VG)

(72) Inventors: John H. Carpenter, Jr., Allen, TX (US); Narasimhan Trichy, Plano, TX (US); Sanjeeva Pindi, Irving, TX (US)

(73) Assignee: Active-Semi, Inc. (VG)

( * ) Notice: Subject to any disclaimer, the term of this patent is extended or adjusted under 35 U.S.C. 154(b) by 13 days.

(21) Appl. No.: 14/720,968

(22) Filed: May 25, 2015

(65) Prior Publication Data

US 2016/0349814 A1   Dec. 1, 2016

(51) Int. Cl.
*G06F 1/00* (2006.01)
*G06F 11/30* (2006.01)
*G06F 1/26* (2006.01)

(52) U.S. Cl.
CPC ..................... *G06F 1/266* (2013.01)

(58) Field of Classification Search
None
See application file for complete search history.

(56) References Cited

U.S. PATENT DOCUMENTS

| | | | |
|---|---|---|---|
| 7,170,259 B2* | 1/2007 | Veselic | H02J 7/00 320/106 |
| 8,237,414 B1* | 8/2012 | Li | H02J 7/0003 320/103 |
| 8,332,545 B1* | 12/2012 | Monks | G06F 13/4291 710/14 |
| 9,146,261 B2* | 9/2015 | Funakoshi | G01R 19/00 |
| 9,336,170 B2* | 5/2016 | Hong | G06F 13/385 |
| 2007/0241769 A1* | 10/2007 | Song | G06F 13/4072 326/30 |
| 2010/0064148 A1* | 3/2010 | Ho | H02J 1/00 713/300 |
| 2012/0210146 A1* | 8/2012 | Lai | G06F 1/266 713/310 |
| 2012/0256596 A1* | 10/2012 | Wada | H02J 7/0055 320/137 |
| 2013/0241469 A1* | 9/2013 | Ono | H02J 7/0042 320/107 |
| 2014/0070791 A1* | 3/2014 | Funakoshi | G01R 19/00 324/76.11 |
| 2014/0239886 A1* | 8/2014 | Lalitnuntikul | H02J 7/0052 320/107 |

(Continued)

*Primary Examiner* — Nitin Patel
(74) *Attorney, Agent, or Firm* — Imperium Patent Works; Amir V. Adibi; Daniel D. Tagliaferri

(57) ABSTRACT

An adaptive USB port controller is disclosed. In an exemplary embodiment, a system comprises a source, a power adapter, a USB port controller, a USB plug and cable, and a device. In one example, the device includes a rechargeable battery. After connecting the device to the USB port controller via the USB plug and cable, a reconfigurable module within the USB port controller sets a power mode by: (1) configuring an impedance network to present impedance modes that indicate available power modes, (2) detecting voltages on one or more of the USB conductors in response to each impedance mode, and (3) comparing the detected voltages to reference voltage levels to set one of multiple power modes. The reconfigurable module then controls the power adapter to transfer power according to the determined power mode.

21 Claims, 11 Drawing Sheets

(56) References Cited

U.S. PATENT DOCUMENTS

| | | | | |
|---|---|---|---|---|
| 2015/0035477 A1* | 2/2015 | Wong | .................... | H02J 7/0068 |
| | | | | 320/107 |
| 2016/0011238 A1* | 1/2016 | Kulkarni | ................ | G01R 17/02 |
| | | | | 320/137 |

* cited by examiner

ADAPTIVE USB PORT

CONTROL CIRCUITRY

CONFIGURABLE IMPEDANCE NETWORK

700 →

| | SW CTL [0] | SW CTL [1] | SW CTL [2] | SW CTL [3] | SW CTL [4] |
|---|---|---|---|---|---|
| | SWITCHES 634, 636 | SWITCHES 626, 640, 632, 642 | SWITCH 638 | SWITCH 644 | SWITCHES 628, 630 |
| FIRST CONFIG. | CLOSED | OPEN | OPEN | OPEN | OPEN |
| SECOND CONFIG. | CLOSED | CLOSED | CLOSED | OPEN | OPEN |
| THIRD CONFIG. | OPEN | OPEN | CLOSED | OPEN | OPEN |
| FOURTH CONFIG. | OPEN | OPEN | CLOSED | CLOSED | OPEN |
| FIFTH CONFIG. | OPEN | OPEN | OPEN | OPEN | CLOSED |

SETTING OF SWITCHES TO SET CONFIGURATION OF
CONFIGURABLE IMPEDANCE NETWORK

FIG. 7

DC/DC ADAPTIVE USB PORT CONTROLLER
(ALTERNATE EMBODIMENT)

DC/DC ADAPTIVE USB PORT CONTROLLER
(ALTERNATE EMBODIMENT)

ADAPTIVE USB PORT CONTROLLER

TECHNICAL FIELD

The present disclosure relates generally to power converters, and more particularly to controlling output power of Universal Serial Bus (USB) ports.

BACKGROUND INFORMATION

Many electronic devices include energy storage systems and Universal Serial Bus (USB) adapters. In such an electronic device, the energy storage system is typically a rechargeable battery. The USB adapter enables the electronic device to be connected to a USB port of a USB charger via a USB cable. When the electronic device is plugged into the USB port of the USB charger, the rechargeable battery can be charged by a charging current that is output from the USB charger.

In one example, a charger is matched to a particular device having a rechargeable battery. When the charger is connected to the device, power transfer is optimal such that the battery charges in the shortest amount of time. However, if the charger is connected to another device that is not matched to the charger, then the power transfer may be less than optimal such that battery charge times are extended. A more robust solution is desired.

SUMMARY

A power system comprises a power source, a power adapter, an adaptive USB port controller, a USB plug, a USB cable, and a device. The power source is an Alternating Current (AC) voltage source or a Direct Current (DC) voltage source. The power adapter is supplied by the power source. The adaptive USB port controller is coupled to the power adapter. In one example, the device is a mobile communication device that includes a rechargeable battery. The rechargeable battery is to be charged by connecting the mobile communication device to the adaptive USB port controller via the USB cable and plug. The USB cable includes a VOUT conductor, a DP conductor, a DM conductor, and a ground conductor. The adaptive USB port controller generates and outputs a supply voltage/current to the mobile communication device via the VOUT conductor of the USB cable.

The supply voltage/current is generated in accordance with a power mode determined by the device connected to the adaptive USB port controller via the USB cable. Once the USB plug is inserted into the USB port thereby causing the mobile communication device to be electrically coupled to the USB port controller, a reconfigurable USB network module within the adaptive USB port controller sets the power mode by: (1) configuring an impedance network to present impedance modes that indicate available power modes, (2) detecting voltages on one or more of the USB conductors in response to one or more of the impedance modes, and (3) comparing the detected voltages to reference voltage levels to set one of multiple power modes.

In one example, the adaptive USB port controller is configurable to generate a supply voltage having a voltage level of 5V, 9V, 12V, or 20V. As a result of detecting the power mode, the novel adaptive USB port controller yields optimal output power for charging and operating different types of devices made by different manufacturers.

The foregoing is a summary and thus contains, by necessity, simplifications, generalizations and omissions of detail; consequently it is appreciated that the summary is illustrative only. Still other methods, and structures and details are set forth in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 7 is a table showing exemplary modes and corresponding switch settings of the configurable impedance network shown in FIG. 4.

Reference will now be made in detail to some embodiments of the invention, examples of which are illustrated in the accompanying drawings.

DETAILED DESCRIPTION

Figure 1:
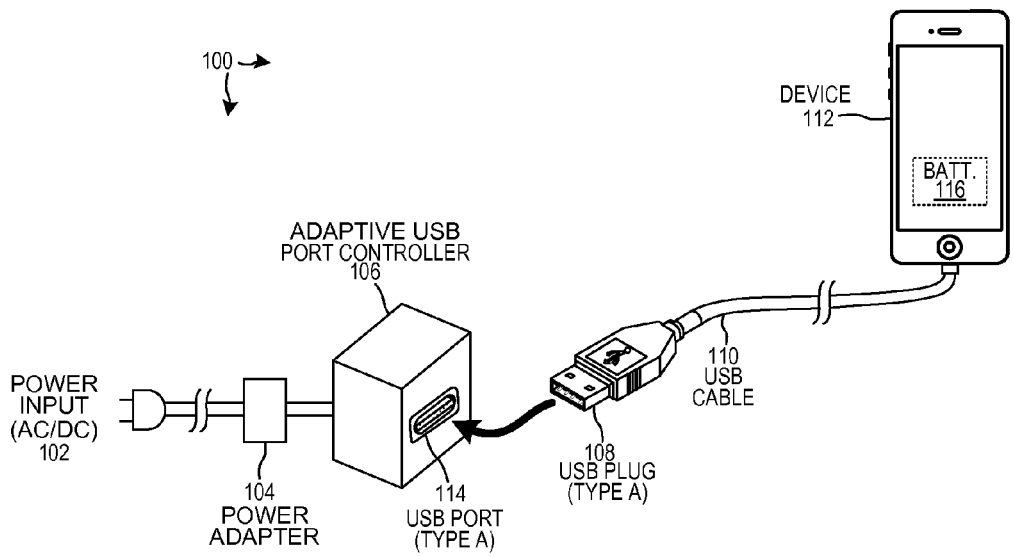
FIG. 1 is a diagram of an exemplary power system.

FIG. 1 is a diagram of an exemplary power system 100. The power system 100 comprises a power input 102, a power adapter 104, an adaptive USB port controller 106, a USB plug 108, a USB cable 110, and a device 112. The USB port controller 104 includes a USB port 114. The USB plug 108 is inserted into the USB port 114 of the adaptive USB port controller 106. In the example of FIG. 1, the device 112 is a mobile communication device having battery 116. The power adapter 104 is supplied by power input 102. Power input 102 is an Alternating Current (AC) source or a Direct Current (DC) voltage source. Power adapter 104 supplies power to the adaptive USB port controller 106. When USB plug 108 is plugged into USB port 114, the battery 116 is charged by USB port 114 via USB plug 108 and conductors within cable 110.

In an exemplary embodiment, USB plug 108 of FIG. 1 is a type A USB plug, and the USB port 114 is a type A USB port. In other embodiments, the USB plug and the USB port are of a different type. For example, in another embodiment USB plug 108 is a type B USB plug, and the USB port 114 is a type B USB port. In another embodiment USB plug 108 is a Mini-A type USB plug, and the USB port 114 is a Mini-A type USB port. In yet another embodiment USB plug 108 is a Mini-B type USB plug, and the USB port 114 is a Mini-B type USB port. In another embodiment USB plug 108 is a Micro-A type USB plug, and the USB port 114 is a Micro-A type USB port. In yet another example USB plug 108 is a Micro-B type USB plug, and the USB port 114 is a Micro-B type USB port.

During operation, when the USB plug 108 is plugged into the USB port 114, the device 112 attempts to discover the type of charger it is connected to so that it can determine the amount of power that can be safely drawn from the charger. During this process, the adaptive USB port controller 106 presents a sequence of impedance modes to the device. The impedance modes are representative of power transfer modes available to the device from the USB port. As the sequence of impedance modes is presented, the device 112 responds or indicates the preferred impedance mode and hence the desired power transfer mode. For example, the preferred power transfer mode can provide a desired amount of power transfer from the power adapter 104 to the device 112. Thus, from the device's perspective, the adaptive USB port controller 106 controls the USB port 114 to appear as a charging port that is matched to the device. The device therefore selects an optimal power transfer mode that can be used to efficiently operate the device 112 or to charge the battery 116 in the shortest amount of time. Thus, the adaptive USB port controller 106 can be used to provide power to devices from a variety of manufacturers while appearing to be matched to every device. This power can be used to provide efficient device operation and/or fast battery charging times.

Figure 2:
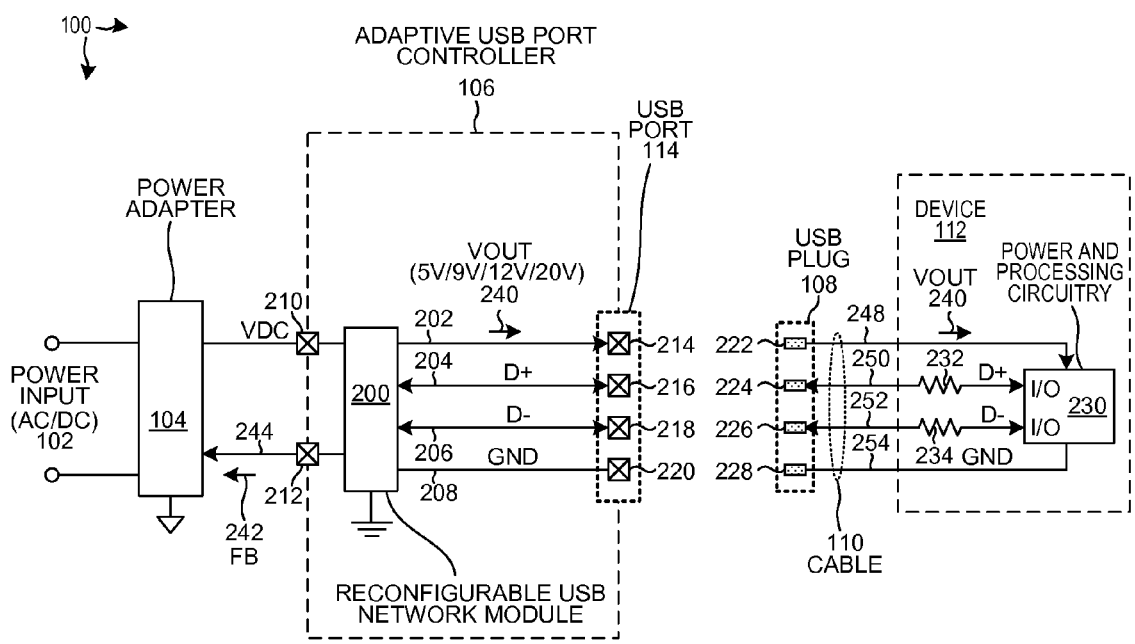
FIG. 2 is an exemplary detailed diagram of the power system shown in FIG. 1.

FIG. 2 is an exemplary detailed diagram of the power system 100 shown in FIG. 1. Adaptive USB port controller 106 includes a reconfigurable USB network module 200, a supply conductor 202, differential signal conductors 204 and 206, a ground conductor 208, and terminals 210 and 212. USB port 114 includes terminals 214, 216, 218, and 220. USB plug 108 includes terminals 222, 224, 226, and 228. Device 112 includes power and processing circuitry 230 and resistances 232 and 234. In an exemplary embodiment, the power and processing circuitry 230 includes battery 116 (not shown in FIG. 2).

Power adapter 104 is supplied by power input 102, which in turn, generates supply voltage signal VDC 240. Supply voltage signal VDC 240 is supplied to reconfigurable USB network module 200 via terminal 210. The USB network module 200 outputs a VOUT signal via conductor 202 to terminal 214.

In an exemplary embodiment, the power adaptor 104 provides a wide range of voltage and current outputs to power a large variety of portable devices. For example, the power adaptor 104 can provide output voltages in the range of zero to twenty (0-20) volts DC and output current in the range of zero to five (0-5) amps DC. The power adaptor 104 can also be configured to provide different or greater power output if necessary.

In an exemplary embodiment, a voltage level of supply voltage signal VDC 240 is controlled by reconfigurable USB network module 200 to be a selectable voltage level selected from a group comprising 5.0V, 9.0V, 12.0V, and 20.0V. In another embodiment, other voltage levels can be available for selection. In an exemplary embodiment, the reconfigurable USB network module 200 supplies a feedback signal FB 242 to power adapter 104 via terminal 212 and conductor 244. Feedback signal FB 242 controls the power adapter 104 to select the supply voltage level of the signal VDC 240 as explained in further detail below.

When adaptive USB port controller 106 is powered by power adapter 104, inserting USB plug 108 into USB port 114 causes power and processing circuitry 230 to receive the supply voltage VOUT 240. Power and processing circuitry 230 receives supply voltage VOUT 240 through the USB port 114, USB plug 108, and a conductor 248 of USB cable 108. Terminal 222 of USB plug 108 is coupled to power and processing circuitry 230 via conductor 248. Terminal 224 of USB plug 108 is coupled to power and processing circuitry 230 via conductor 250. Terminal 226 of USB plug 108 is coupled to power and processing circuitry 230 via conductor 252. Terminal 228 of USB plug 108 is coupled to power and processing circuitry 230 via ground conductor 254.

Once the USB plug 108 is connected to the USB port 114, the power and processing circuit 230 attempts to discover the amount of power that can be safely drawn from the VOUT supply line. During this process, the reconfigurable USB network module 200 presents a sequence of impedance modes on the D+ and D− signal lines that are coupled to the power and processing circuit 230. As the sequence of impedance modes is presented, the power and processing circuit 230 responds or indicates the preferred impedance mode by driving the appropriate voltages on the D+ and D− signal lines. The preferred impedance mode indicates a desired amount of power transfer from the power adapter 104 to the power and processing circuitry 230 such that the device can be efficiently operated and/or the battery 116 can be charged in the shortest amount of time. In an exemplary embodiment, the reconfigurable USB network module 200 uses the FB signal 242 to control the power adapter 104 to output a desired voltage level associated with the preferred power transfer on the VDC signal line. In this example, USB cable 110 is detachable from device 112; however, in other examples the USB cable 110 and USB plug 108 are not detachable from device 112 and parts of device 112.

Figure 3:
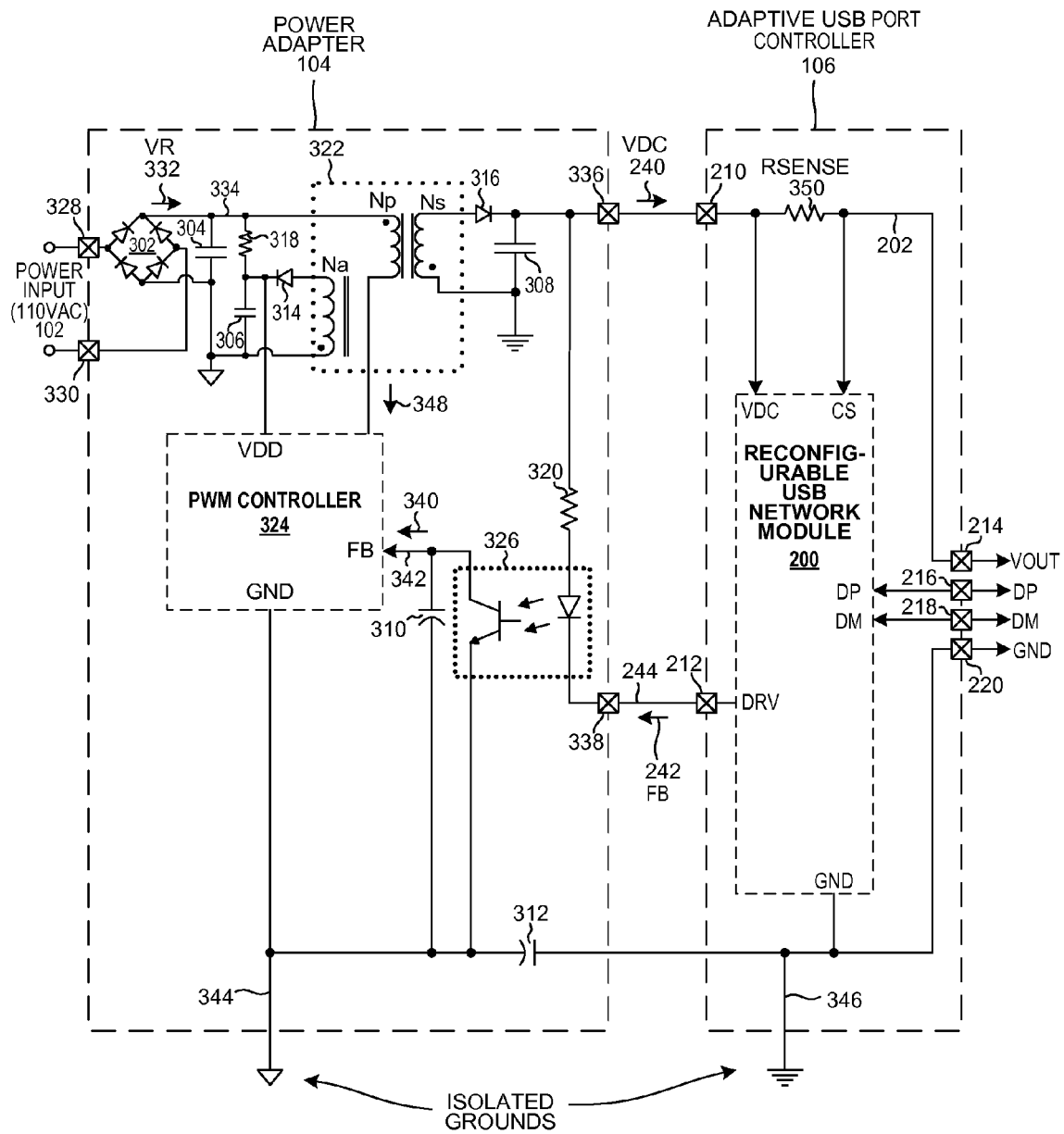
FIG. 3 is an exemplary detailed diagram of a power adapter and an adaptive USB port controller shown in FIG. 2.

FIG. 3 is an exemplary detailed diagram of the power adapter 104 and the adaptive USB port controller 106 shown in FIG. 2. In the example of FIG. 3, power input 102 is an AC voltage source. Power adapter 104 includes AC-to-DC power converter circuitry involving a bridge rectifier 302, capacitors 304, 306, 308, 310, and 312, diodes 314 and 316, resistors 318 and 320, transformer 322, Pulse Width Modulation (PWM) controller 324, and optocoupler 326. Power adapter 104 is coupled to receive an AC voltage signal onto bridge rectifier 306 via power terminals 328 and 330. Bridge rectifier 302 outputs a rectified voltage signal VR 332 onto a first end of winding Np of a transformer 322 via conductor 334. Transformer 322 includes three windings Na, Np, and Ns. Supply voltage signal VDC 240 is output by a first end of winding Ns via terminal 336. The VDC signal 240 is received at terminal 210 that is connected to a first terminal of RSENSE resistor 350. A second terminal of the RSENSE resistor 350 outputs the VOUT signal from terminal 214. The RSENSE resistor 350 has a small resistance value to sense a current associated with the VDS signal. The VOUT signal at the second terminal of the RSENSE resistor is input to a CS terminal of the reconfigurable USB network module 200.

Feedback signal FB 242 controls a voltage level of supply voltage VDC 240. Feedback signal FB 242 is generated and supplied from reconfigurable USB network module 200 via terminal 212, conductor 224, through terminal 338, and onto optocoupler 326. Optocoupler 326 supplies a voltage signal 340 onto PWM controller 324 via conductor 342. A voltage level of voltage signal 340 is controlled by feedback signal FB 242. In response to the FB 342 signal, the PWM controller 324 switches current 348 through a primary winding of transformer 322 thereby controlling generation of output voltage VDC 240 to maintain a selected voltage level. Ground node 344 of the power adapter 104 is isolated from ground node 346 of adaptive USB port controller 106. How reconfigurable USB network module 200 generates feedback signal FB 242 to control supply VDC 240 is explained in further detail below.

Figure 4:
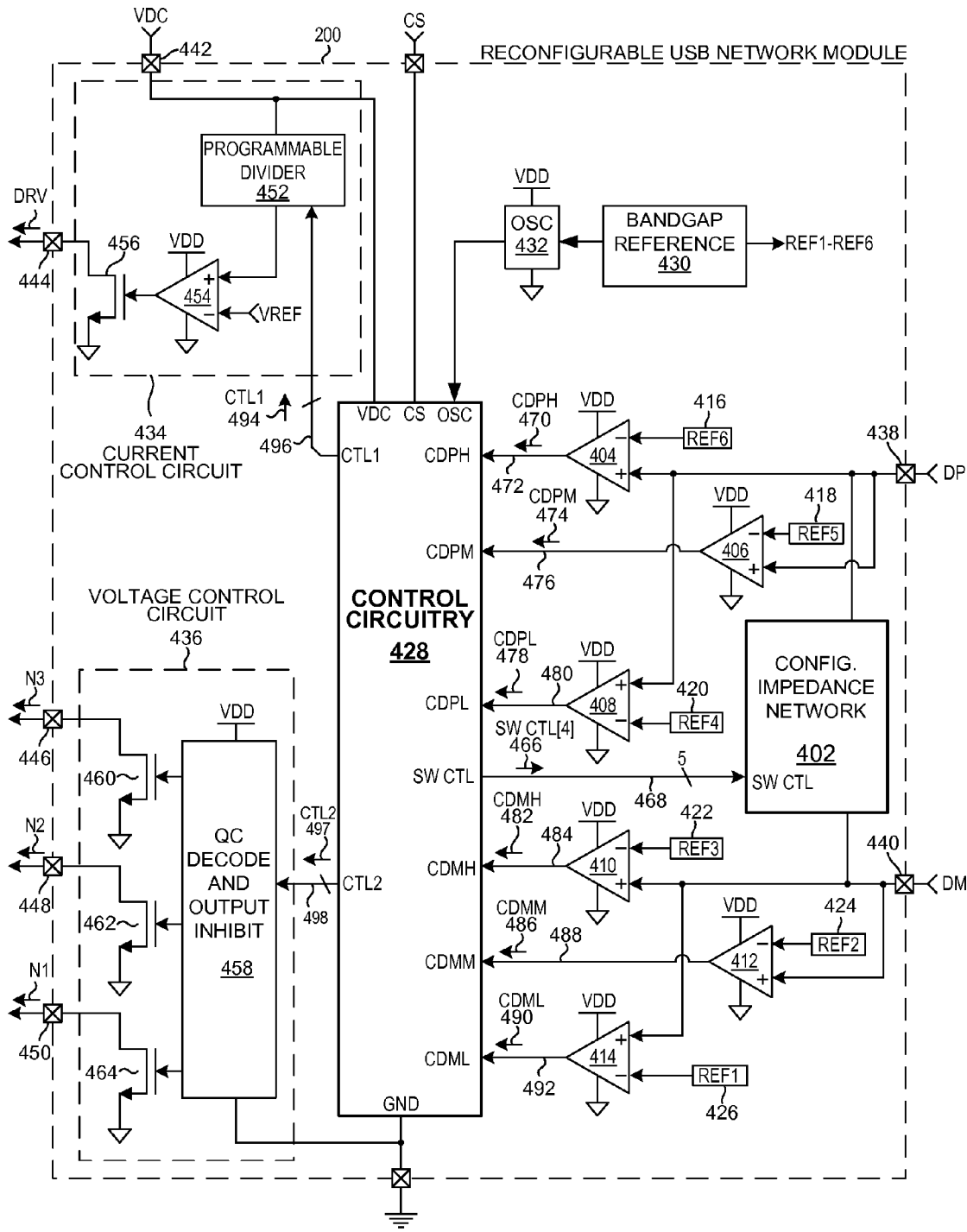
FIG. 4 is an exemplary detailed diagram of a reconfigurable USB network module shown in FIG. 2.

FIG. 4 is an exemplary detailed diagram of the reconfigurable USB network module 200 shown in FIG. 2. Reconfigurable USB network module 200 comprises a configurable impedance network 402, comparators 404, 406, 408, 410, 412, and 414, reference voltages 416, 418, 420, 422, 424, and 426, control circuitry 428, bandgap reference circuit 430, oscillator 432, current control circuit 434, voltage control circuit 436, a DP terminal 438, a DM terminal 440, a supply terminal 442, a feedback terminal DRV 444, and feedback terminals N3 446, N2 448, and N1 450. Current control circuit 434 includes programmable divider 452, amplifier 454, and transistor 456. Voltage control circuit 436 comprises QC decode and output inhibit circuit 458 and transistors 460, 462, and 464. In an exemplary embodiment, the bandgap reference circuit 430 comprises any suitable reference circuit that generates an oscillator reference voltage to the oscillator 432 and also generates the reference voltages (REF1-REF6). The control circuitry 428 also receives the current sense (CS) signal.

In accordance with one novel aspect, control circuitry 428 configures the configurable impedance network 402 by supplying a multi-bit digital control signal SW CTL 466 to configurable impedance network 402 via conductor 468. Multi-bit digital control signal SW CTL 466 controls various switches within configurable impedance network 402 depending on a desired impedance configuration. The configuration of the configurable impedance network 402 is determined by control circuitry 428 based on outputs of comparators 404, 406, 408, 410, 412, and 414. These comparators compare reference voltages (REF1-REF6) to voltages on the DM and DP signal lines to generate corresponding comparator outputs. Control circuitry 428 receives signal CDPH (Comparator DP High) 470 output by comparator 404 via conductor 472. Control circuitry 428 receives signal CDPM (Comparator DP Mid) 474 output by comparator 406 via conductor 476. Control circuitry 428 receives signal CDPL (Comparator DP Low) 478 output by comparator 408 via conductor 480. Control circuitry 428 receives signal CDMH (Comparator DM High) 482 output by comparator 410 via conductor 484. Control circuitry 428 receives signal CDMM (Comparator DM Mid) 486 output by comparator 412 via conductor 488. Control circuitry 428 receives signal CDML (Comparator DM Low) 490 output by comparator 414 via conductor 492.

In accordance with another novel aspect, reconfigurable USB network module 200 is operable in an AC power source application and in a DC power source application. In an AC power source application example, the power input is an AC power source. Reconfigurable USB network module 200 controls power adapter 104 via current control circuit 434. Control circuitry 428 supplies control signal CTL1 494 onto programmable divider 452 via conductor 496. Control signal CTL1 494 sets programmable divider 452 to generate a desired voltage onto amplifier 454 that in turn drives transistor 456. Transistor 456 generates feedback signal FB 242 that drives optocoupler 326. In a DC power source application example, the power input is a DC power source. Reconfigurable USB network module 200 controls power adapter 104 via voltage control circuit 436. Control circuitry 428 supplies control signal CTL2 497 onto QC decode and output inhibit circuit 458 via conductor 498. Control signal CTL2 497 sets register outputs of QC decode and output inhibit circuit 458. The register outputs enable and disable the transistors 460, 462, and 464 which in turn output signals N1, N2, and N3 that control power adapter 104 to output a desired DC voltage.

Figure 5:
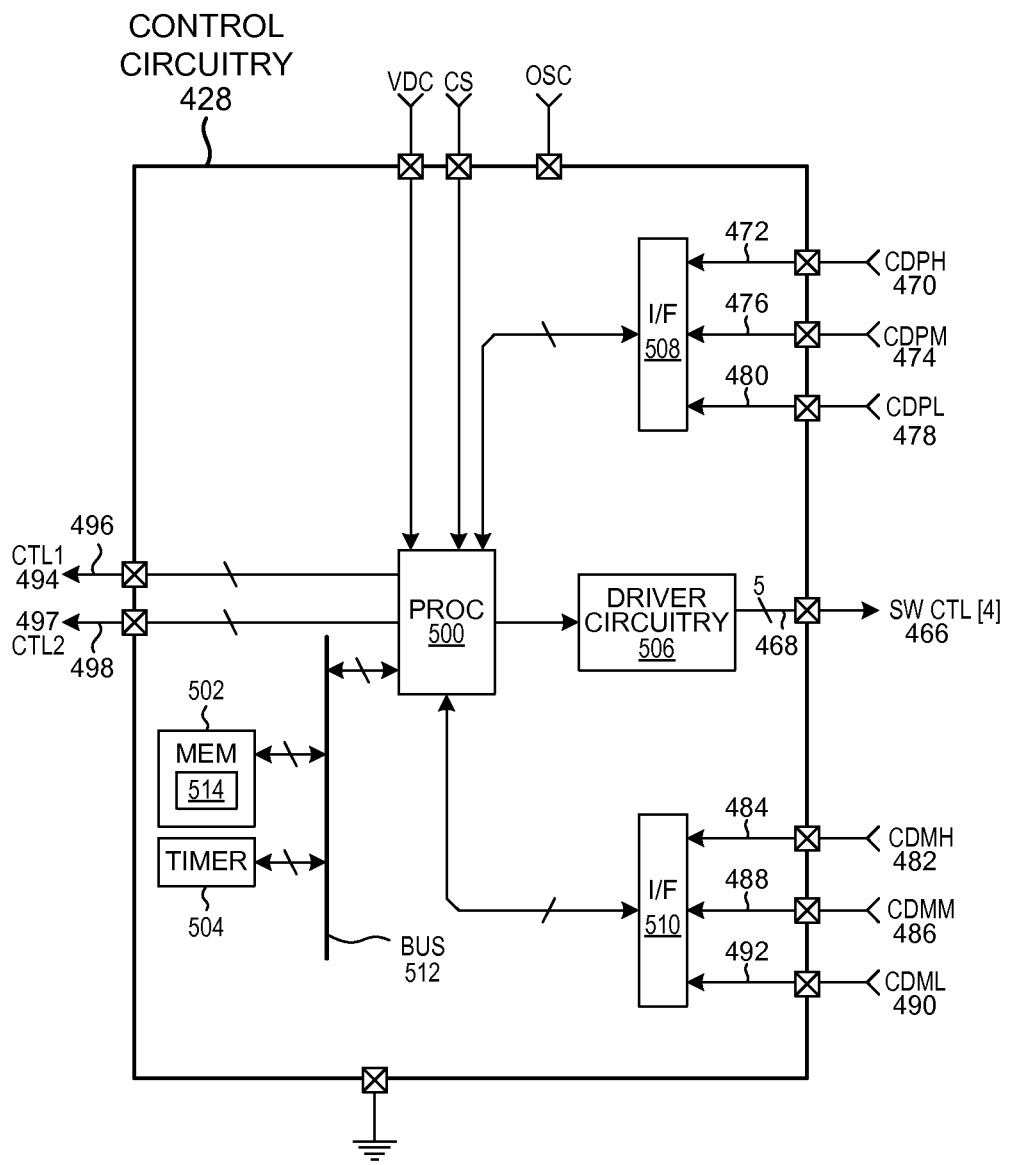
FIG. 5 is an exemplary detailed diagram of control circuitry shown in FIG. 4.

FIG. 5 is an exemplary detailed diagram of the control circuitry 428 shown in FIG. 4. Control circuitry 428 includes a processor 500, a memory 502, a timer 504, driver circuitry 506, interface circuits 508 and 510, and bus 512. Processor 500 controls driver circuitry 506 to output multi-bit digital control signal SW CTL 466 supplied to configurable impedance network 402 via conductors 468. Processor 500 receives signals CDPH 470, CDPM 474, and CDPL 478 via interface circuit 508. Processor 500 receives signals CDMH 482, CDMM 486, and CDML 490 via interface circuit 510. Processor 500 is configurable to output control signal CTL1 494 via conductor 496 and is also configurable to output control signal CTL2 497 via conductor 498. The processor 500 also receives the VDC and CS signals.

Processor 500 may be any suitable processor. For example, processor 500 may be realized as a central processing unit (CPU), a general-purpose microprocessor, a state machine, a micro-controller or other suitable processor. Processor 500 communicates with memory 502 and timer 504 via bus 512. Processor 500 executes an amount of processor executable instructions 514 stored in memory 502. The amount of processor executable instructions 514 is a set of instructions for execution by processor 500 in accordance with the methods of FIG. 8, FIG. 9, and FIG. 12.

Memory 502 may be implemented in one or more of any number of suitable types of memory. For example, memory 502 may be realized as a static random access memory (SRAM), a dynamic RAM (DRAM), an electrically erasable programmable read-only memory (EEPROM), or any other suitable memory capable of storing and retrieving instructions and/or data. Processor 500 reads from or writes to memory 502 via bus 512.

Timer 504 may be any suitable timing device. For example, the timer 504 may be realized in hardware or by hardware executing software. Timer 504 is accessible by processor 500 via bus 512. Processor 500 utilizes timer 504 to measure time intervals during which the configurable resistor network 402 is maintained in one of a plurality of different configurations in accordance with the novel methods set forth below.

In an exemplary embodiment, the interface circuits 508 and 510 comprise at least one of analog to digital converters, amplifiers, filters, buffers, transistors, discrete components, registers or any other suitable hardware that is configured to receive the comparator outputs and generate corresponding digital signals that are input to the processor 500. In an exemplary embodiment, the driver circuitry 506 comprises at least one of digital to analog converters, amplifiers, filters, buffers, transistors, discrete components, registers or any other suitable hardware that is configured to receive control signals from the processor 500 and generate corresponding switch control signals that are input to the configurable impedance network 402.

In an exemplary embodiment, the processor 500 determines a power mode to transfer power to a device by performing the method 800, the method 900, or the method 1200 as describe below. In an exemplary embodiment, voltages on the DP and DM signal lines are measured and compared to reference voltages to determine a voltage mode, which indicates a voltage level to be used for the power transfer. For example, the following exemplary table can be used to determine the voltage mode (or VOUT voltage) based on the measurement of voltages on the DP and DM signal lines.

| Voltage mode | DP voltage | DM voltage | VOUT |
| --- | --- | --- | --- |
| 1 | >REF4 | <REF1 | 5 volt |
| 2 | >REF6 | >REF1 | 9 volt |
| 3 | >REF6 | >REF3 | 20 volt |
| 4 | >REF4 | >REF1 | 12 volt |

In an exemplary embodiment, the voltage reference levels have the following values.

| Reference | Example Value | Example Range |
| --- | --- | --- |
| REF1 | 0.1 V | 0-0.3 V |
| REF2 | 0.6 V | 0.4 V to 0.8 V |
| REF3 | 2.0 V | 1.5 V to 3.3 V |
| REF4 | 0.6 V | 0.4 V to 0.8 V |
| REF5 | 1.7 V | 1.0 V to 1.9 V |
| REF6 | 2.0 V | 1.5 V to 3.3 V |

During operation the processor 500 controls the driver circuitry 506 to set the configuration of the configurable impedance network 402 using the SW CTL signals 466. In an exemplary embodiment, the configuration of the configurable impedance network 402 is changed to communicate power profiles to the device plugged into the USB port 114. A sequence of configurations may be used to communicate available power profiles to the device. In an exemplary embodiment, one or more of the configurations are maintained for an associated time interval as measured by the timer 504. A more detailed description of the operation of the processor 500 to set configurations of the configurable impedance network 402 and to measure the associated time intervals is provided below. In an exemplary embodiment, seven time intervals are utilized and are derived from the following exemplary table of time intervals.

| Time Interval | Example Value | Example Range |
| --- | --- | --- |
| 1 | 10 ms | 1 ms-100 ms |
| 2 | 20 ms | 1 ms-100 ms |
| 3 | 10 ms | 1 ms-100 ms |
| 4 | 100 ms | 10 ms-500 ms |
| 5 | 300 ms | 10 ms-500 ms |
| 6 | 300 ms | 10 ms-500 ms |
| 7 | 50 ms | 10 ms-500 ms |

Figure 6:
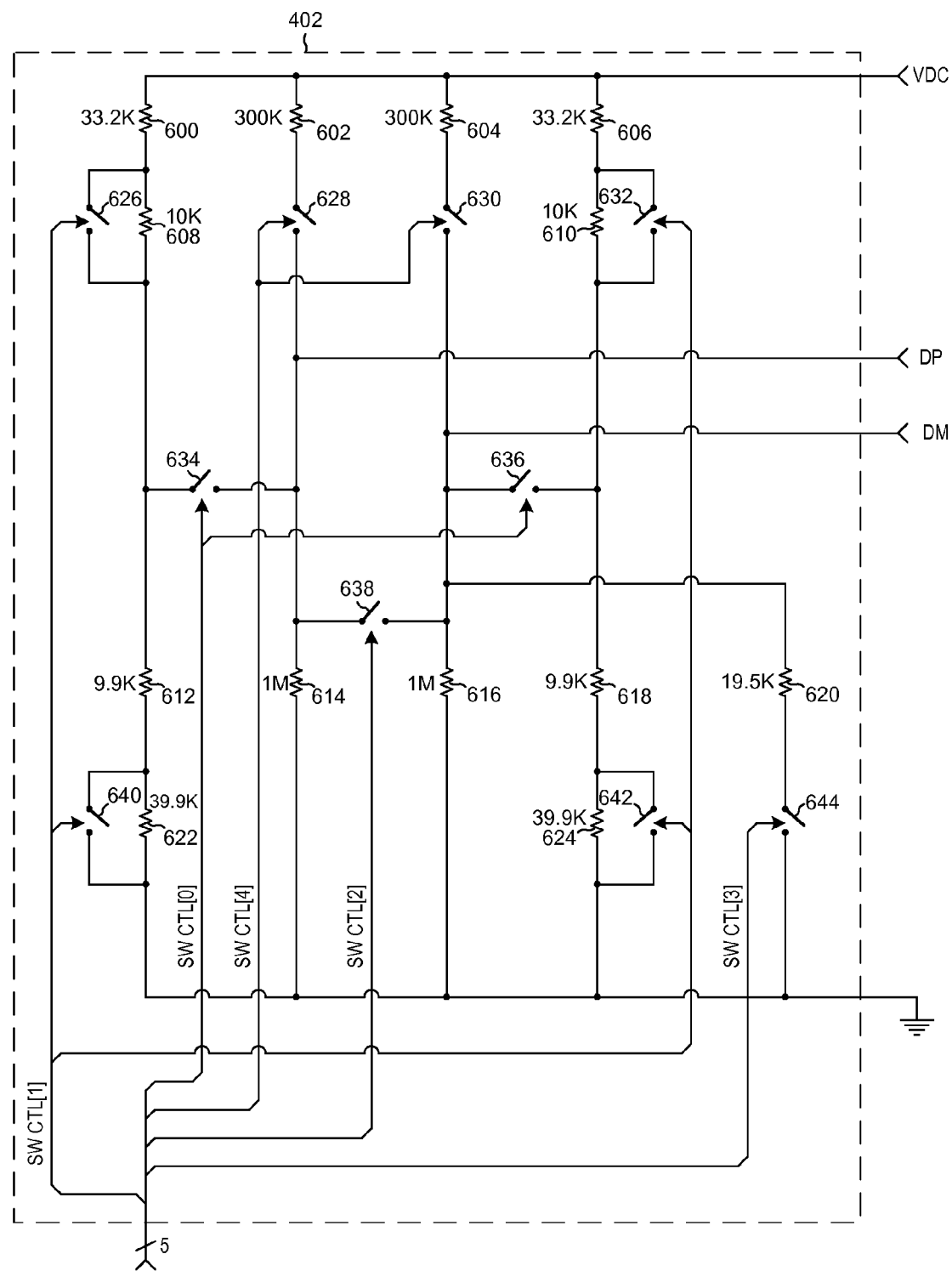
FIG. 6 shows an exemplary detailed diagram of a configurable impedance network shown in FIG. 4.

FIG. 6 shows an exemplary detailed diagram of the configurable impedance network 402 shown in FIG. 4. In various exemplary embodiments, the configurable impedance network may comprises resistors, inductors, and/or capacitors along with one or more switches that are opened or closed to generate one or more impedance configurations. For clarity, the configurable impedance network 402 shown in FIG. 6 comprises resistors and switches. However, in other embodiments, other components may be utilized.

The configurable impedance network 402 shown in FIG. 6 comprises resistances 600, 602, 604, 606, 608, 610, 612, 614, 616, 618, 620, 622, and 624, and switches 626, 628, 630, 632, 634, 636, 638, 640, and 642. The resistance values of the resistors are shown in FIG. 6. It should be noted that these values are exemplary and that other resistance values can be utilized.

Each bit of multi-bit digital control signal SW CTL 466 controls a different set of switches. SW CTL[0] bit controls switches 634 and 636. SW CTL[1] bit controls switches 626 and 632. SW CTL[2] bit controls switch 638. SW CTL[3] bit controls switch 644. SW CTL[4] bit controls switches 628 and 630. As the switches are opened and closed in response to the SW CTL signals, corresponding resistors in the network 402 are enabled or disabled to implement each impedance configuration. The impedance network 402 is connected to the supply voltage (VDC), the signal ground, the DP signal line, and the DM signal line. Thus, the various impedance configurations appear on the DP and DM signal lines and therefore are presented to a device connected to the USB port 114.

FIG. 7 is a table 700 showing exemplary impedance configurations (or modes) and corresponding switch settings of the configurable impedance network 402. In this example, configurable impedance network 402 is configurable in five configurations (or modes). Table 700 shows the switch setting for each bit of multi-bit digital control signal SW CTL 466. For example, SW CTL(0) controls switches (634, 636), SW CTL(1) controls switches (626, 640, 632, 642), SW CTL(2) controls switch (638), SW CTL(3) controls switch (644), and SW CTL(4) controls switches (628, 630). Thus, the processor 500 implements each of the identified configurations by setting the SW CTL signals to open and close the appropriate switches as identified in FIG. 7.

It should be noted that the table 700 can be expanded to include any number of impedance configurations and that the methods 800, 900, and 1200 can be modified to present any number of configurations to a device, such that the device's optimum power transfer requirements can be supported. Thus, a wide variety of devices having different operating/charging power transfer requirements can be supported.

Figure 8:
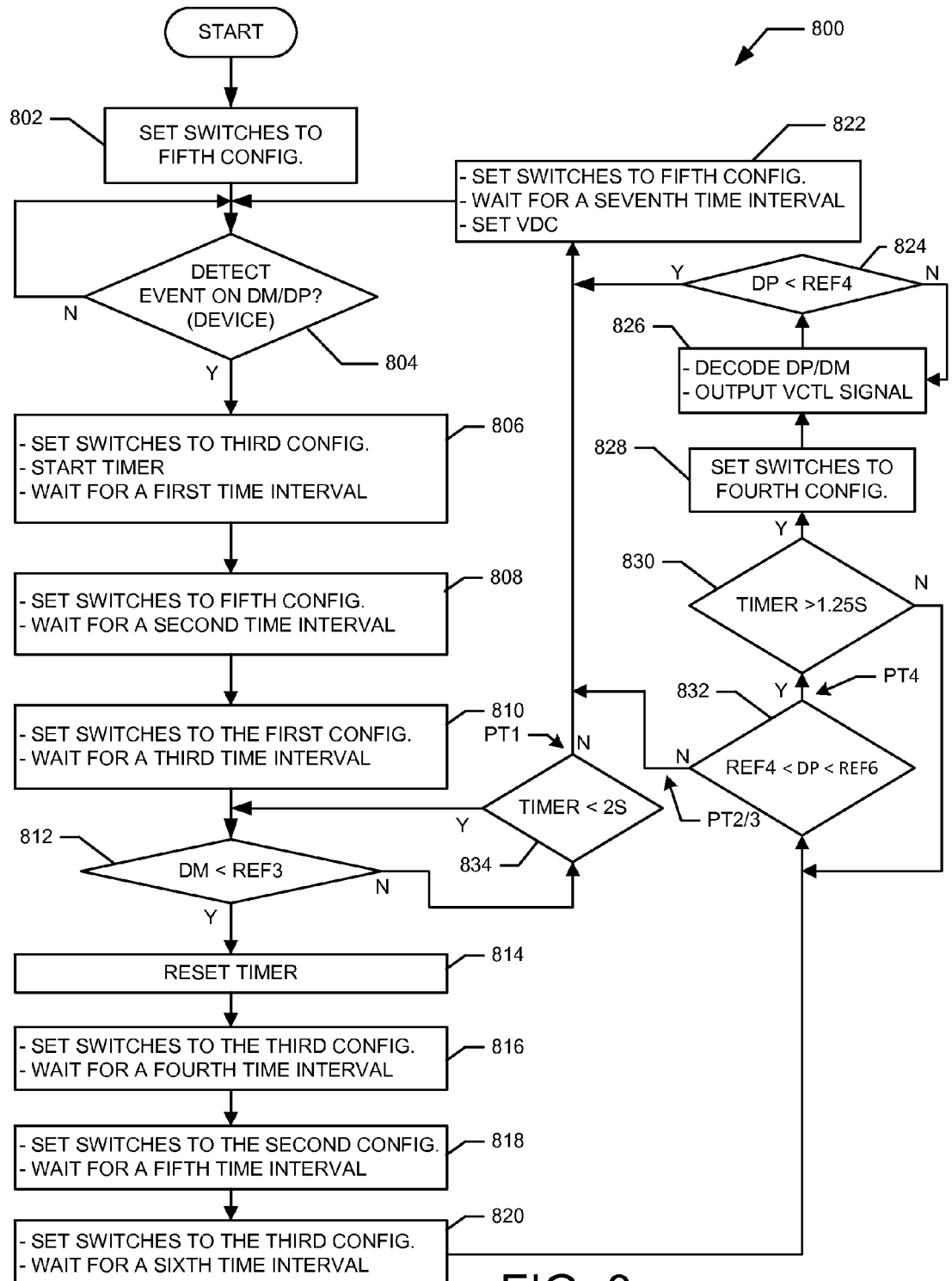
FIG. 8 is an exemplary method for operating an adaptive USB port controller to achieve fast charging times for a plurality of chargeable devices.

FIG. 8 is an exemplary method 800 for operating an adaptive USB port controller to set a power transfer mode to transfer power to a plurality of devices to achieve fast battery charging times. For example, the method 800 is suitable for use with the reconfigurable network module 200 shown in FIG. 4.

At block 802, the switches (626-644) of the configurable impedance network 402 are set to the fifth configuration as shown in FIG. 7. In an exemplary embodiment, the processor 500 controls the driver circuit 506 to output the switch control signals 466 to set the switches (626-644) to obtain the fifth configuration as represented in FIG. 7. To set the initial power mode, the processor 500 outputs the CTL1 signal 496 to control the power adapter 104 to set the VDC signal 240 to five (5) volts. The fifth configuration of the impedance network 402 is presented on the DM and DP signal lines.

At block 804, a determination is made as to whether an event is detected on the DM or DP signal lines. For example, one event occurs when the USB plug 108 that is part of device 112 is connected to the USB port 114. In an exemplary embodiment, an event is defined as any activity that activates any of the comparators 404, 408, 410, 414 such that a corresponding comparator output signal changes state. For example, the output of comparator 404 or the output of comparator 410 may change state based on activity on the DP or DM signal lines due to the connection of a device. This voltage change is detected by the processor 500, which indicates that an event has occurred. Thus, any voltage detected by the processor 500 can be defined as an event. If an event is not detected, the method proceeds back to block 804. If an event is detected, the method proceeds to block 806.

At block 806, the switches (626-644) of the configurable impedance network 402 are set according to the third configuration shown in FIG. 7. A timer is started and a first time interval is measured. For example, the in an exemplary embodiment, the processor 500 controls the driver circuit 506 to output the switch control signals 466 to set the switches (626-644) according to the third configuration as shown in FIG. 7. The processor 500 also resets and starts the timer 504 to begin measuring the first time interval. During the first time interval, the third impedance configuration is presented on the DP and DM signal lines. At the completion of the first time interval, the method proceeds to block 808.

At block 808, the switches (626-644) of the configurable impedance network 402 are set according to a fifth configuration as shown in FIG. 7 and a second time interval is measured. For example, the in an exemplary embodiment, the processor 500 controls the driver circuit 506 to output the switch control signals 466 to set the switches (626-644) according to the to the fifth configuration. The processor 500 also controls the timer 504 to measure the second time interval. For example, the processor 500 obtains the current time from the timer 504 at the start of block 808 and waits until the time value of the timer 504 measures the second time interval from the current time. During the second time interval, the fifth impedance configuration is presented on the DP and DM signal lines. At the completion of the second time interval, the method proceeds to block 810.

At block 810, the switches (626-644) of the configurable impedance network 402 are set according to the first configuration and a third time interval is measured. For example, in an exemplary embodiment, the processor 500 controls the driver circuit 506 to output the switch control signals 466 to set the switches (626-644) according to the first configuration. The processor 500 also controls the timer 504 to measure the third time interval. For example, the processor 500 obtains the current time from the timer 504 at the start of block 810 and waits until the time value of the timer 504 measures the third time interval from the current time. During the third time interval, the first impedance configuration is presented on the DP and DM signal lines. At the completion of the third time interval, the method proceeds to block 812.

At block 812, a determination is made as to whether a voltage on the DM signal line is less than the REF3 reference voltage level. In an exemplary embodiment, the processor 500 makes this determination by testing the (CDMH) output of the comparator 410. If the voltage on the DM signal line is not less than the REF3 level, the method proceeds to block 834. If the voltage on the DM signal line is less than the REF3 level, the method proceeds to block 814.

At block 834, a determination is made as to whether the timer value is currently less than two (2) seconds. For example, the processor 500 reads the current value of the timer 504 and makes this determination. If the current timer value is less than two seconds, the method proceeds to block 812. If the current timer value is not less than two second, the method proceeds to block 822. At this point power transfer to the device occurs using a first power transfer (PT1) mode as indicated in FIG. 8. For example, the first power transfer mode may comprise power at a voltage level of five volts and sourcing a first current level in accordance with the device's optimum current consumption.

At block 822, the switches (626-644) of the configurable impedance network 402 are set according to the fifth configuration and a seventh time interval is measured. For example, in an exemplary embodiment, the processor 500 controls the driver circuit 506 to output the switch control signals 466 to set the switches (626-644) according to the fifth configuration. The processor 500 also controls the timer to measure the seventh time interval. For example, the processor 500 obtains the current time from the timer 504 at the start of block 822 and waits until the time value of the timer 504 measures the seventh time interval from the current time. During the seventh time interval, the fifth impedance configuration is presented on the DP and DM signal lines. At the completion of the seventh time interval, VDC voltage is set to five volts as described above and the method proceeds to block 804.

At block 814, the timer 504 is reset. For example, the processor 500 operates to reset the timer 504 to zero and the timer begins measuring time intervals from this initial value.

At block 816, the switches (626-644) of the configurable impedance network 402 are set according to the third configuration and a fourth time interval is measured. For example, in an exemplary embodiment, the processor 500 controls the driver circuit 506 to output the switch control signals 466 to set the switches (626-644) according to the fourth configuration. The processor 500 also controls the timer 504 to measure the fourth time interval. For example, the processor 500 obtains the current time from the timer 504 at the start of block 816 and waits until the time value of the timer 504 measures the fourth time interval from the current time. During the fourth time interval, the third impedance configuration is presented on the DP and DM signal lines. At the completion of the fourth time interval, the method proceeds to block 818.

At block 818, the switches (626-644) of the configurable impedance network 402 are set according to the second configuration and a fifth time interval is measured. For example, the in an exemplary embodiment, the processor 500 controls the driver circuit 506 to output the switch control signals 466 to set the switches (626-644) according to the second configuration. The processor 500 also controls the timer 504 to measure the fifth time interval. For example, the processor 500 obtains the current time from the timer 504 at the start of block 818 and waits until the time value of the timer 504 measures the fifth time interval from the current time. During the fifth time interval, the second impedance configuration is presented on the DP and DM signal lines. At the completion of the fifth time interval, the method proceeds to block 820.

At block 820, the switches (626-644) of the configurable impedance network 402 are set according to the third configuration and a sixth time interval is measured. For example, in an exemplary embodiment, the processor 500 controls the driver circuit 506 to output the switch control signals 466 to set the switches (626-644) according to the third configuration. The processor 500 also controls the timer 504 to measure the sixth time interval. For example, the processor 500 obtains the current time from the timer 504 at the start of block 820 and waits until the time value of the timer 504 measures the sixth time interval from the current time. During the sixth time interval, the third impedance configuration is presented on the DP and DM signal lines. At the completion of the sixth time interval, the method proceeds to block 832.

At block 832, a determination is made as to whether the voltage on the DP signal line is less than the REF6 reference voltage level and greater than the REF4 reference voltage level. In an exemplary embodiment, the processor 500 makes this determination by evaluating the CDPH voltage output from the comparator 404 and by evaluating the CDPL voltage output from the comparator 408. The outputs of these comparators indicate the stage of the voltage level of the DP signal line. If the voltage on the DP signal line is not less than the REF6 level or not greater than the REF4 level, the method proceeds to block 822. At this point power transfer to the device occurs using a second or third power transfer (PT2/3) mode as indicated in FIG. 8. For example, the second power transfer (PT2) mode may comprise power at a voltage level of five volts and sourcing a second current level in accordance with the device's optimum current consumption. The third power transfer (PT3) mode may comprise power at a voltage level of five volts and sourcing a third current level in accordance with the device's optimum current consumption.

If the voltage on the DP signal line is less than the REF6 level and greater than the REF4 level, the method proceeds to block 830. At this point power transfer to the device occurs using a fourth power transfer (PT4) mode as indicated in FIG. 8. For example, the fourth power transfer (PT4) mode may comprise power at a voltage level selected from 5, 9, 12, or 20 volts and sourcing a fourth current level in accordance with the device's optimum current consumption. The voltage selection occurs at block 826 based on the voltage mode table above.

At block 830, a determination is made to determine whether the timer value is currently greater than (1.25) seconds. For example, the processor 500 reads the current value of the timer 504 and makes this determination. If the current timer value is not greater than 1.25 seconds, the method proceeds back to block 832. If the current timer value is greater than 1.25 seconds, the method proceeds to block 828.

At block 828, the switches (626-644) of the configurable impedance network 402 are set according to the fourth configuration. For example, in an exemplary embodiment, the processor 500 controls the driver circuit 506 to output the switch control signals 466 to set the switches (626-644) according to the fourth configuration. The method proceeds to block 826.

At block 826, the DP and DM signal lines are decoded to determine the required output voltage to be used by the device. In an exemplary embodiment, the DP and DM signal lines are decoded by the processor 500 using the voltage mode table shown above to determine the output voltage to be set on the Vout line. For example, the DM and DP signal lines are input to the comparators 404, 406, 408, 410, 412 and 414 shown in FIG. 4. These comparators compare the voltage levels of the DM and DP signal lines to the corresponding reference voltages. The processor 500 receives the comparator outputs and uses these outputs to determine the voltage mode from the voltage mode table. Once the processor 500 determines the required output voltage, the processor 500 generates the appropriate feedback signal (e.g., CTL1, CTL2) that is output to the power converter to request the determined output voltage.

At block 824, a determination is made as to whether the voltage on the DP signal line is less than the REF4 threshold level. In an exemplary embodiment, the processor 500 makes this determination from the output of the comparator 408. If the voltage on the DP signal line is not less than the REF4 level, the method proceeds to back to block 826. If the voltage on the DP signal line is less than the REF4 level, the method proceeds to block 822.

Thus, the method 800 is suitable for use with the reconfigurable network module 200 shown in FIG. 4 to achieve fast charging times for a plurality of chargeable devices. It should be noted that the operations of the method 800 may be rearranged or modified as would be known to one with skill in the art such that other embodiments are possible.

Figure 9:
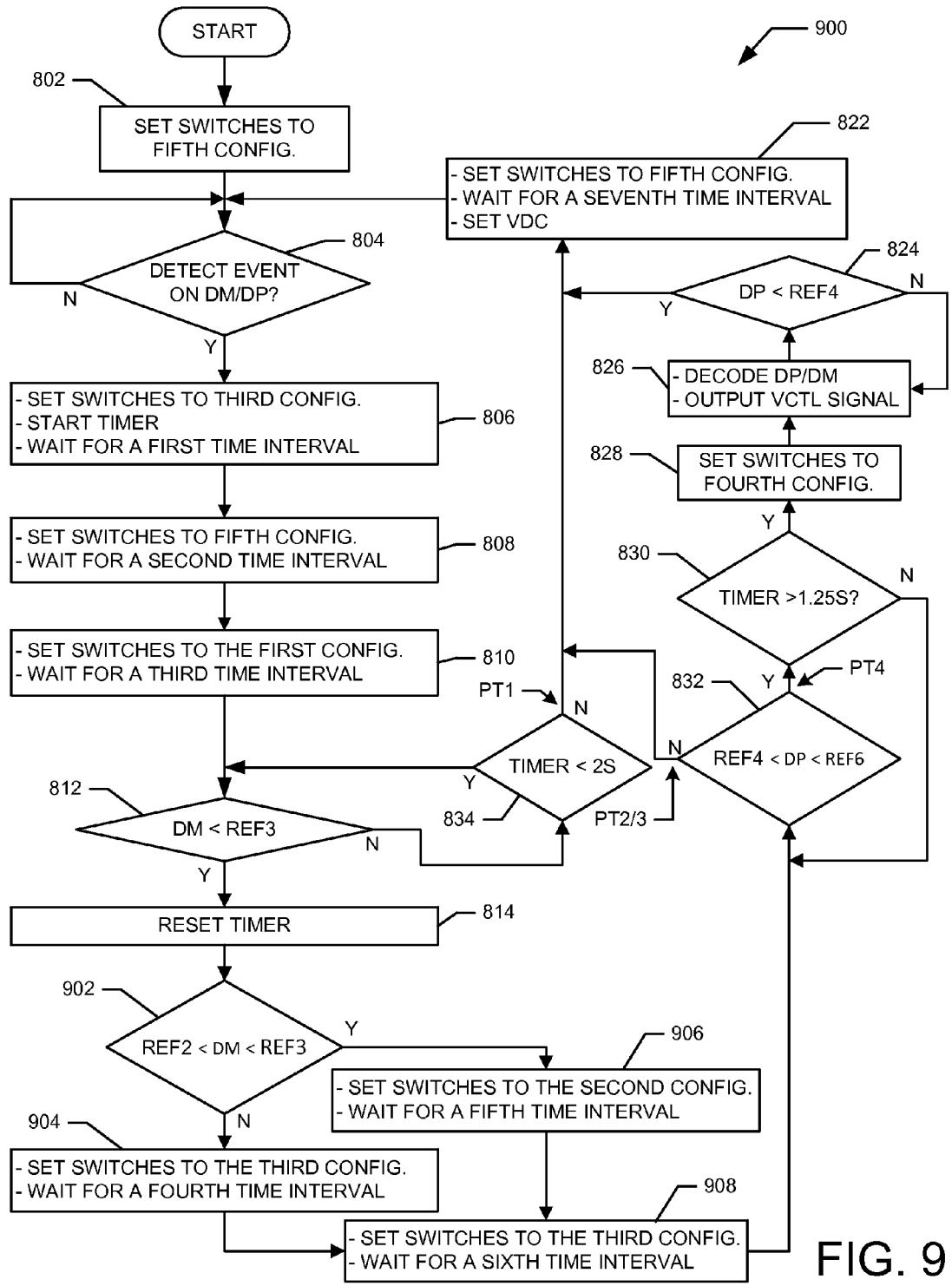
FIG. 9 is an exemplary alternative method for operating an adaptive USB port controller to achieve fast charging times for a plurality of chargeable devices.

FIG. 9 is an exemplary alternative method 900 for operating an adaptive USB port controller to achieve fast charging times for a plurality of chargeable devices. For example, the method 900 is suitable for use with the reconfigurable network module 200 shown in FIG. 4. In an exemplary embodiment, many of the operations of the method 900 are the same at the method 800 and are not described below. However, the method 900 comprises alternative operations that are described in detail below.

At block 814, the timer 504 is reset as described above.

At block 902, a determination is made as to whether the voltage on the DM signal line is less than the REF3 threshold level and greater than the REF2 threshold level. In an exemplary embodiment, the processor 500 makes this determination by evaluating the output of the comparators 410 and 412. If the voltage on the DM signal line is not less than the REF3 level or not greater than the REF2 level, the method proceeds to block 904. If the voltage on the DM signal line is less than the REF3 level and greater than the REF2 level, the method proceeds to block 906.

At block 904, the switches (626-644) of the configurable impedance network 402 are set according to the third configuration and a fourth time interval is measured. For example, in an exemplary embodiment, the processor 500 controls the driver circuit 506 to output the switch control signals 466 to set the switches (626-644) according to the third configuration. The processor 500 also controls the timer 504 to measure the fourth time interval. For example, the processor 500 obtains the current time from the timer 504 at the start of block 904 and waits until the time value of the timer 504 measures the fourth time interval from the current time. During the fourth time interval, the third impedance configuration is presented on the DP and DM signal lines. At the completion of the fourth time interval, the method proceeds to block 908.

At block 906, the switches (626-644) of the configurable impedance network 402 are set according to the second configuration and a fifth time interval is measured. For example, in an exemplary embodiment, the processor 500 controls the driver circuit 506 to output the switch control signals 466 to set the switches (626-644) according to the second configuration. The processor 500 also controls the timer 504 to measure the fifth time interval. For example, the processor 500 obtains the current time from the timer 504 at the start of block 906 and waits until the time value of the timer 504 measures the fifth time interval from the current time. During the fifth time interval, the second impedance configuration is presented on the DP and DM signal lines. At the completion of the fifth time interval, the method proceeds to block 908.

At block 908, the switches (626-644) of the configurable impedance network 402 are set according to the third configuration and a sixth time interval is measured. For example, in an exemplary embodiment, the processor 500 controls the driver circuit 506 to output the switch control signals 466 to set the switches (626-644) according to the third configuration. The processor 500 also controls the timer 504 to measure the sixth time interval. For example, the processor 500 obtains the current time from the timer 504 at the start of block 908 and waits until the time value of the timer 504 measures the sixth time interval from the current time. During the sixth time interval, the third impedance configuration is presented on the DP and DM signal lines. At the completion of the sixth time interval, the method proceeds to block 832.

Thus, the method 900 is suitable for use with the reconfigurable network module 200 shown in FIG. 4 to achieve fast charging times for a plurality of chargeable devices. It should be noted that the operations of the method 900 may be rearranged or modified as would be known to one with skill in the art such that other embodiments are possible.

Figure 10:
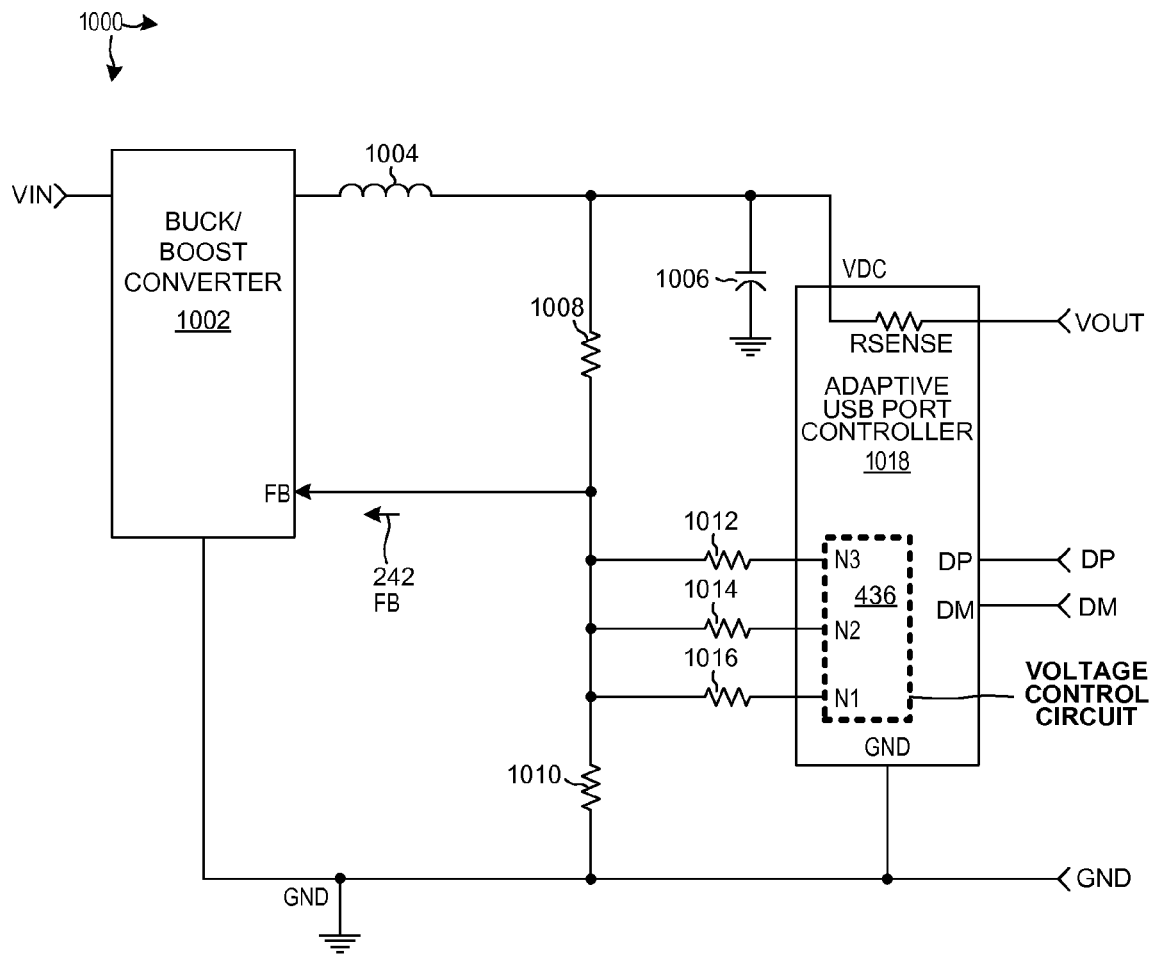
FIG. 10 is an exemplary diagram of another power system where the input power is a DC voltage source.

FIG. 10 is an exemplary diagram of a power system 1000 where the input power is a DC voltage source. System 1000 includes buck/boost converter 1002, USB port controller 1018, inductor 1004, capacitor 1006, and resistances 1008, 1010, 1012, 1014, and 1016. Feedback signal 242 is provided to buck/boost converter 1002 from voltage control circuit 436 via resistances 1012, 1014, and 1016.

Figure 11:
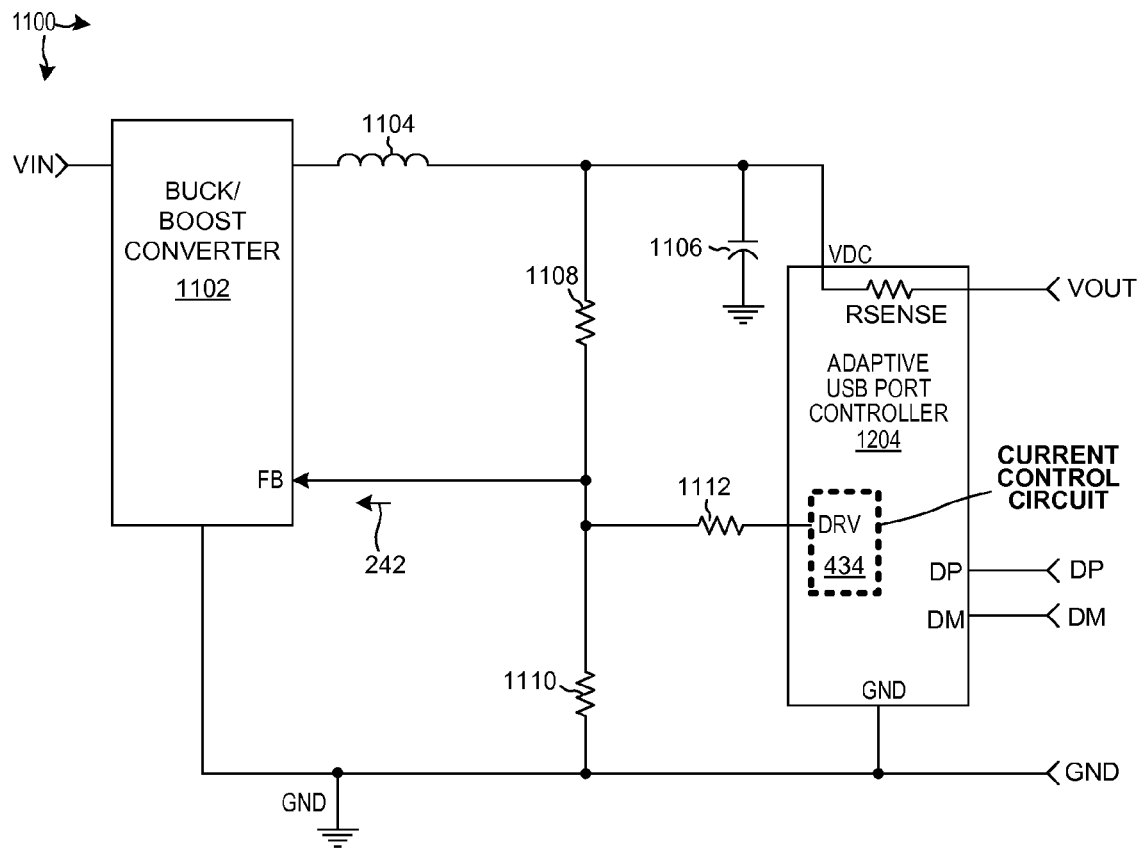
FIG. 11 is an exemplary diagram of still another power system where the input power is a DC voltage source.

FIG. 11 is an exemplary diagram of a power system 1100 where the input power is a DC voltage source. System 1100 includes buck/boost converter 1102, USB port controller 1114, inductor 1104, capacitor 1106, and resistances 1108, 1110, and 1112. Feedback signal 242 is provided to buck/boost converter 1002 from current control circuit 434 via resistance 1112.

Figure 12:
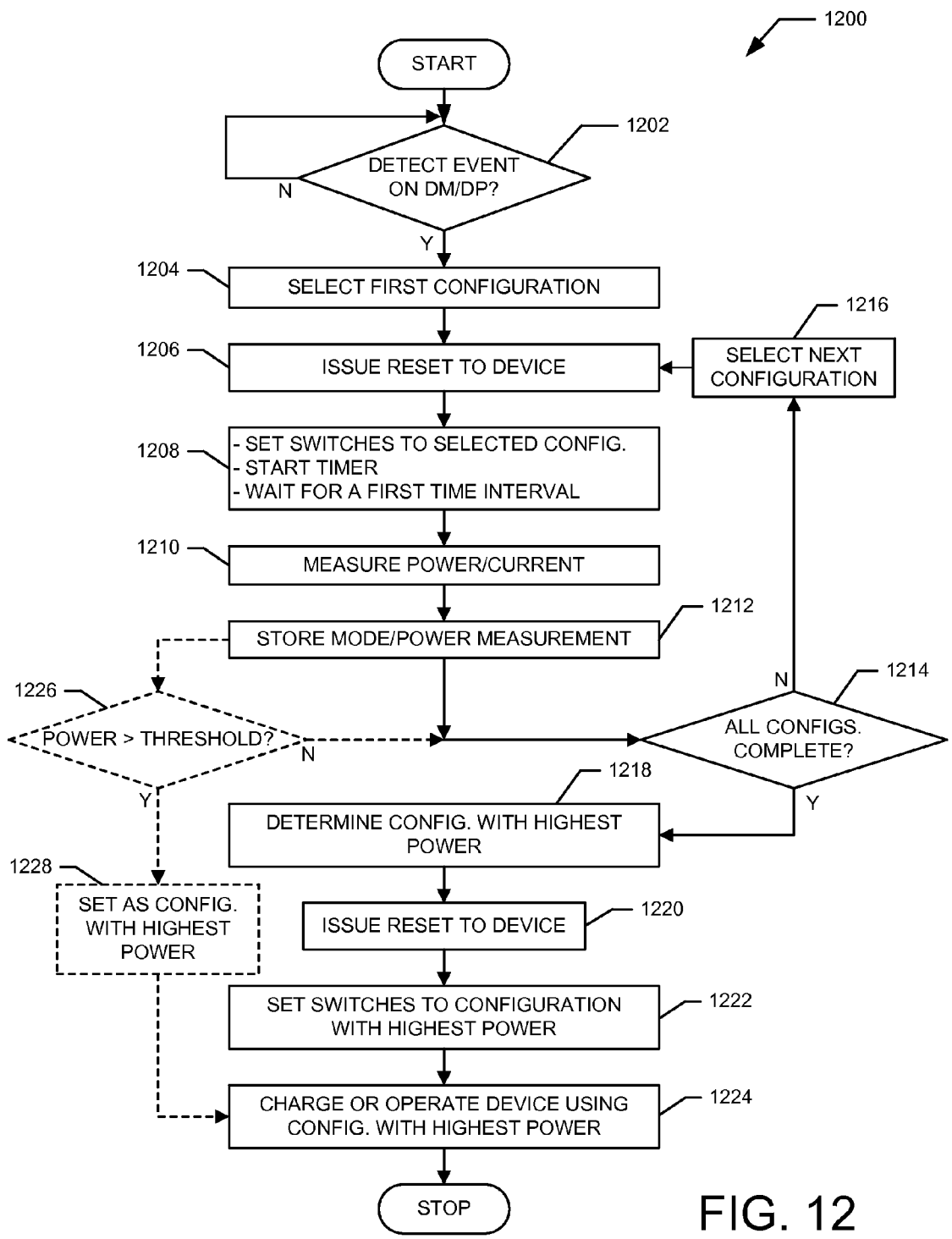
FIG. 12 is an exemplary alternative method for operating an adaptive USB port controller to achieve fast charging times for a plurality of chargeable devices.

FIG. 12 is an exemplary alternative method 1200 for operating an adaptive USB port controller to achieve fast charging times for a plurality of chargeable devices. For example, the method 1200 is suitable for use with the reconfigurable network module 200 shown in FIG. 4 with the voltage VDC set to five volts.

At block 1202, a determination is made as to whether an event is detected on either of the DM or DP signal lines. For example, the processor 500 detects voltage changes on these signal lines using the interface circuits 508 and 510. The voltage levels on the DM and DP signal lines may changes when a device is connected to the USB port. If no events are detected, the method repeats block 1202. If an event (e.g., voltage change) is detected, the method proceeds to block 1204.

At block 1204, a first configuration is selected. For example, the processor 500 selects a first configuration from the table 700. The method proceeds to block 1206 to determine if a power transfer mode associated with the selected configuration is to be used to charge/power the device.

At block 1206, a reset is issued to the device. For example, the processor 500 issues a reset to the device by controlling the power adapter 104 to pull the VOUT signal below the USB under voltage limit, which in an exemplary embodiment is approximately 3.9 volts. For example, in an exemplary embodiment, the processor 500 controls the power adaptor 104 using either the CTL1 or CTL2 signal lines to control the voltage level on the VOUT signal line to drop below the 3.9 volt threshold such that a reset is provided to the connected USB device.

At block 1208, the switches (626-644) of the configurable impedance network 402 are set according to the selected configuration and a first time interval is measured. For example, in an exemplary embodiment, the processor 500 controls the driver circuit 506 to output the switch control signals 466 to set the switches (626-644) according to the selected configuration. The processor 500 also controls the timer 504 to measure the first time interval. For example, the processor 500 obtains the current time from the timer 504 at the start of block 1208 and waits until the time value of the timer 504 measures the first time interval from the current time. During the first time interval, the selected impedance configuration is presented on the DP and DM signal lines. At the completion of the first time interval, the method proceeds to block 1210.

At block 1210, a power/current measurement is obtained from the device in response to the selected mode. For example, the processor 500 receives the VDC and VOUT signals and has knowledge of the resistance value of the RSENSE resistor 350. Using this information the processor 500 determines a voltage drop across the RSENSE resistor and from this voltage drop and the resistance value determines the power/current being used by the attached device.

At block 1212, the selected configuration and its corresponding power/current measurement are stored. For example, the processor stores this information in the memory 502.

At block 1214, a determination is made as to whether all configurations have been checked. For example, the processor 500 determines if all the configurations in the table 700 have been presented to the device to determine the best (or most suitable) power transfer mode. If all configurations have not been checked, the method proceeds to block 1216. If all configurations have been checked, the method proceeds to block 1218.

At block 1216, the next configuration is selected. For example, the processor 500 selects the next configuration in the table 700 to determine if the power transfer mode associated with this configuration is the best mode (e.g., results in highest power transfer) to use for charging/powering the device. The method then proceeds to block 1206.

At block 1218, the configuration associated with the highest power/current is determined. For example, the processor 500 evaluates the power/current values stored for each configuration to determine the configuration associated with the highest power/current.

At block 1220, a reset is issued to the device. For example, the processor 500 issues a reset to the device by controlling the power adapter 104 to pull the VOUT signal below the USB under voltage limit, which in an exemplary embodiment is approximately 3.9 volts. For example, in an exemplary embodiment, the processor 500 controls the power adaptor 104 using either the CTL1 or CTL2 signal lines to control the voltage level on the VOUT signal line to drop below the 3.9 volt threshold such that the reset is provided to the connected USB device.

At block 1222, the switches of the reconfigurable impedance network are set to the configuration with the highest power. For example, the processor 500 sets the switches of the reconfigurable impedance network to the configuration associated with the highest power.

At block 1224, the device is charged or operated using the configuration with the highest power/current measurement.

In an optional exemplary embodiment, the method flows from block 1212 to block 1226. At block 1226, a determination is made as to whether the measured power/current exceeds a selected threshold. For example, the processor 500 compares the measured power/current to the selected threshold. In an exemplary embodiment, the threshold is 5 watts. If the measured power meets or exceeds this threshold the method proceeds to block 1228. If the measured power does not meet this threshold, the method proceeds to block 1214.

At block 1228, the current configuration that is associated with the power that exceeds the threshold is selected as the configuration with the highest power. The method then proceeds to block 1224 where this configuration is utilized for charging/powering the device.

Thus, the method 1200 is suitable for use with the reconfigurable network module 200 shown in FIG. 4 to achieve fast charging times for a plurality of chargeable devices. It should be noted that the operations of the method 1200 may be rearranged or modified as would be known to one with skill in the art such that other embodiments are possible.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method comprising:
 configuring an impedance network that is connected to DP and DM signal lines of a USB port, wherein the impedance network is configured in a plurality of configurations that present a plurality of impedance modes to an external device connected to the DP and DM signal lines, and wherein the external device is adapted to be supplied with power via the USB port;
 detecting voltages on the DP and DM signal lines in response to one or more of the impedance modes; and
 determining a selected power mode from a plurality of power modes based on a comparison of one or more of the detected voltages to at least three voltage reference levels, and wherein power is transferred to the external device based on the selected power mode.

2. The method of claim 1, further comprising:
 detecting that the external device is connected to the USB port.

3. The method of claim 1, further comprising:
 generating a feedback signal that indicates a voltage level associated with the power mode.

4. The method of claim 3, further comprising:
 inputting the feedback signal to a power converter that outputs an operating voltage having the voltage level.

5. The method of claim 3, wherein the voltage level is selected from a set of voltage levels comprising a five volt level, a nine volt level, a twelve volt level, and a twenty volt level.

6. The method of claim 1, wherein the impedance network comprises a plurality of resistors and a plurality of switches, and the operation of configuring comprises opening and closing the switches in response to switch control signals to form the one or more impedance modes.

7. The method of claim 6, further comprising:
 connecting the DP signal line to first pull-up and pull-down resistances and the DM signal line to second pull-up and pull-down resistances to form a first impedance mode;
 connecting the DP signal line to the DM signal line, and the DP signal line to third pull-up and pull-down resistances to form a second impedance mode; and
 connecting the DP signal line to the DM signal line, and the DP signal line to a fourth pull-down resistance to form a third impedance mode.

8. A method comprising:
 configuring an impedance network that is connected to DP and DM signal lines of a USB port, wherein the impedance network is configured in a plurality of configurations that present a plurality of impedance modes to an external device connected to the DP and DM signal lines, and wherein the configuring comprises:
  connecting the DP signal line to first pull-up and pull-down resistances and the DM signal line to second pull-up and pull-down resistances to form a first impedance mode;
  connecting the DP signal line to the DM signal line, and the DP signal line to third pull-up and pull-down resistances to form a second impedance mode
  connecting the DP signal line to the DM signal line, and the DP signal line to a fourth pull-down resistance to form a third impedance mode;
  connecting the DP signal line to the DM signal line, and the DP signal line to a fifth pull-down resistance to form a fourth impedance mode; and
  connecting the DP signal line to sixth pull-up and pull-down resistances and the DM signal line to seventh pull-up and pull-down resistances to form a fifth impedance mode;
 detecting voltages on the DP and DM signal lines in response to one or more of the impedance modes; and
 determining a selected power mode from a plurality of power modes based on a comparison of one or more of the detected voltages to one or more voltage reference levels, wherein power is transferred to the external device based on the selected power mode, and wherein the impedance network comprises a plurality of resistors and a plurality of switches, and the operation of configuring comprises opening and closing the switches in response to switch control signals to form the one or more impedance modes.

9. The method of claim 8, further comprising:
 maintaining the first, second, third, fourth, and fifth impedance modes for corresponding time intervals.

10. An apparatus comprising:
 a configurable impedance network that is connected to DP and DM signal lines of a USB port, wherein the configurable impedance network is configurable in a plurality of configurations that present a plurality of impedance modes to an external device connected to the DP and DM signal lines, and wherein the external device is adapted to receive a supply voltage from the USB port; and
 a processor that controls the impedance network to present one or more of the impedance modes on the DP and DM signal lines and detects voltages on the DP and DM signal lines in response to one or more of the impedance modes, wherein the processor determines a selected power mode from a plurality of power modes based on a comparison of one or more of the detected voltages to at least three voltage reference levels, and wherein power is transferred to the external device based on the selected power mode.

11. The apparatus of claim 10, wherein the configurable impedance network comprises a plurality of resistors and a plurality of switches, wherein the switches are opened or closed in response to switch control signals generated by the processor to form the one or more impedance modes.

12. The apparatus of claim 10, wherein the one or more impedance modes comprise:
 a first impedance mode, wherein the DP signal line is connected to first pull-up and pull-down resistances and the DM signal line is connected to second pull-up and pull-down resistances;
 a second impedance mode, wherein the DP signal line is connected to the DM signal line, and wherein the DP signal line is connected to third pull-up and pull-down resistances; and a third impedance mode, wherein the DP signal line is connected to the DM signal line, and wherein the DP signal line is connected to a fourth pull-down resistance.

13. The apparatus of claim 10, further comprising:
a timer that measures time intervals for each of the first, second, third, fourth, and fifth impedance modes.

14. The apparatus of claim 10, the processor further comprising:
a feedback output node that outputs a feedback signal that is coupled to a feedback control circuit.

15. The apparatus of claim 14, wherein the feedback control circuit generates a drive current based on the feedback signal, and wherein the drive current is coupled to set a voltage level of the selected power mode.

16. The apparatus of claim 14, wherein the feedback control circuit generates at least one voltage signal based on the feedback signal, and wherein the at least one voltage signal is coupled to set a voltage level of the selected power mode.

17. The apparatus of claim 10, wherein at least one power mode has a voltage level selected from a set of voltage levels comprising a five volt level, a nine volt level, a twelve volt level, and a twenty volt level.

18. The apparatus of claim 10, wherein the processor detects that the external device is connected to the USB port.

19. An apparatus comprising:
a configurable impedance network that is connected to DP and DM signal lines of a USB port, wherein the configurable impedance network is configurable in a plurality of configurations that present a plurality of impedance modes to an external device connected to the DP and DM signal lines; and
a processor that controls the impedance network to present one or more of the impedance modes on the DP and DM signal lines and detects voltages on the DP and DM signal lines in response to one or more of the impedance modes, wherein the processor determines a selected power mode from a plurality of power modes based on a comparison of one or more of the voltages to one or more voltage reference levels, wherein power is transferred to the external device based on the selected power mode, and wherein the one or more impedance modes comprise:

a first impedance mode, wherein the DP signal line is connected to first pull-up and pull-down resistances and the DM signal line is connected to second pull-up and pull-down resistances;
a second impedance mode, wherein the DP signal line is connected to the DM signal line, and wherein the DP signal line is connected to third pull-up and pull-down resistances;
a third impedance mode, wherein the DP signal line is connected to the DM signal line, wherein the DP signal line is connected to a fourth pull-down resistance;
a fourth impedance mode, wherein the DP signal line is connected to the DM signal line, and wherein the DP signal line is connected to a fifth pull-down resistance; and
a fifth impedance mode, wherein the DP signal line is connected to sixth pull-up and pull-down resistances and the DM signal line is connected to seventh pull-up and pull-down resistances.

20. An apparatus comprising:
an impedance network that is connected to DP and DM signal lines of a USB port, wherein the impedance network is configured in a plurality of configurations that present a plurality of impedance modes to an external device connected to the DP and DM signal lines, and wherein the external device is adapted to receive charge from the apparatus; and
means for detecting voltages on the DP and DM signal lines in response to one or more of the impedance modes, wherein the means is also for determining a selected power mode from a plurality of power modes based on a comparison of one or more of the detected voltages to at least three voltage reference levels, and wherein power is transferred to the external device based on the selected power mode.

21. The apparatus of claim 20, wherein the means is a processor, wherein the processor configures the impedance network by causing switch control signals SW CTL[4] to be generated and supplied to the impedance network, and wherein the processor determines the selected power mode by comparing detected voltages to voltage reference levels.

* * * * *